United States Patent
Nguyen et al.

(10) Patent No.: US 10,436,072 B2
(45) Date of Patent: Oct. 8, 2019

(54) ELASTOMERIC SHOCK ABSORBERS FOR GAS TURBINE TRANSPORTATION

(71) Applicant: General Electric Company, Schenectady, NY (US)

(72) Inventors: Quoc Hoai Nguyen, Houston, TX (US); Ashish Agrawal, Houston, TX (US); Horacio Solis, Queretaro (MX); Yunyi Zou, Houston, TX (US); Tho V. Nguyen, Houston, TX (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/435,465

(22) Filed: Feb. 17, 2017

(65) Prior Publication Data

US 2018/0238195 A1    Aug. 23, 2018

(51) Int. Cl.

| | |
|---|---|
| B60P 7/08 | (2006.01) |
| F01D 25/28 | (2006.01) |
| F02C 7/20 | (2006.01) |
| F16M 1/04 | (2006.01) |
| B60P 7/16 | (2006.01) |
| F16M 13/04 | (2006.01) |

(52) U.S. Cl.
CPC .............. *F01D 25/285* (2013.01); *B60P 7/16* (2013.01); *F02C 7/20* (2013.01); *F16M 1/04* (2013.01); *F16M 13/04* (2013.01); *F05D 2260/02* (2013.01)

(58) Field of Classification Search
CPC .. B60P 1/6409; B60P 3/00; B60P 7/16; B60P 7/18; F01D 25/04; F01D 2220/32; F01D 25/28; F01D 25/285; F05D 2240/90

USPC .............. 410/86, 87, 88, 80, 117, 122, 155; 384/215, 221; 267/140.3, 140.4, 140.11, 267/140.13, 141.1, 292, 294, 281; 248/638; 280/681, 687; 206/593; 105/392.5; 244/118.1, 137.1

See application file for complete search history.

(56) References Cited

U.S. PATENT DOCUMENTS

| | | | | |
|---|---|---|---|---|
| 2,743,956 | A | * | 5/1956 | Birkenstein, Jr. ......... B62B 5/00 410/86 |
| 3,179,067 | A | * | 4/1965 | Beck ........................ B61D 3/18 410/26 |
| 3,269,333 | A | * | 8/1966 | Schmidt ............... B61D 45/008 410/80 |
| 4,105,266 | A | * | 8/1978 | Finney ..................... B64C 27/48 267/152 |
| 4,696,618 | A | | 9/1987 | Fairchild et al. |
| 4,717,094 | A | | 1/1988 | Chee |
| 4,932,636 | A | | 6/1990 | Phillips et al. |
| 5,112,144 | A | | 5/1992 | Law |
| 5,205,546 | A | | 8/1993 | Schisler et al. |
| 5,263,815 | A | | 11/1993 | Brenner |
| 5,271,678 | A | * | 12/1993 | Bourgeot ................. B61D 3/10 384/221 |

(Continued)

*Primary Examiner* — Stephen T Gordon
(74) *Attorney, Agent, or Firm* — Eversheds Sutherland (US) LLP (57) ABSTRACT

This application provides elastomeric shock absorbers for turbine transportation. Example engine mounts may include a first plate, a second plate, and an elastomeric bearing positioned between the first plate and the second plate. The engine mount may be configured to absorb or dampen vibration along an X-axis, a Y-axis, and a Z-axis of a turbine during transportation.

17 Claims, 8 Drawing Sheets

(56) References Cited

U.S. PATENT DOCUMENTS

| | | | |
|---|---|---|---|
| 5,474,258 A | 12/1995 | Taylor et al. | |
| 5,738,330 A * | 4/1998 | Folkens | F16F 1/40 |
| | | | 267/294 |
| 6,280,127 B1 * | 8/2001 | Spilker | B60P 7/18 |
| | | | 410/120 |
| 6,334,746 B1 * | 1/2002 | Nguyen | F16M 3/00 |
| | | | 410/156 |
| 8,267,349 B2 | 9/2012 | Suciu et al. | |
| 8,876,448 B1 * | 11/2014 | Hess | B60P 7/06 |
| | | | 410/46 |
| 9,927,005 B2 * | 3/2018 | Hvass | F16H 1/32 |

* cited by examiner

ELASTOMERIC SHOCK ABSORBERS FOR GAS TURBINE TRANSPORTATION

TECHNICAL FIELD

The present application and the resultant patent relate generally to gas turbines and more particularly relate to elastomeric shock absorbers for gas turbine transportation.

BACKGROUND OF THE INVENTION

Some turbines, such as gas turbine engines, steam turbine engines, aeroderivative turbines, and other turbines, may be used to generate power or otherwise drive a load. In some instances, turbines may have stationary enclosures during operation. For example, a turbine may be used to provide or supplement power to an electrical grid, and the turbine may be in a stationary enclosure at a power plant.

From time to time, turbines may be moved or transported. For example, during delivery of a turbine, a turbine may be transported from a factory to a power plant. In other instances, turbines may be moved from one location to another.

Turbines may include a number of components that may be in a specific alignment in order to operate properly and/or at optimal performance. During transportation or movement of a turbine, damage to one or more components may occur. For example, occurrences such as shock due to road conditions, vibrations due to vehicle movement, and other occurrences during transport may cause damage to, or misalignment of, certain turbine components. Such damage may render a turbine inoperable or reduce performance. Preventing damage to turbines and misalignment of turbine components may therefore be desired.

SUMMARY OF THE INVENTION

This application and the resultant patent provide elastomeric shock absorbers for turbine transportation. An example engine mount may include a first plate, a second plate, and an elastomeric bearing positioned between the first plate and the second plate. The engine mount may be configured to absorb or dampen vibration along an X-axis, a Y-axis, and a Z-axis of a turbine during transportation.

This application and the resultant patent further provide a method of using an elastomeric shock absorber with a gas turbine engine. The method may include the steps of providing a gas turbine engine for transportation, providing a turbine enclosure for the gas turbine engine, grounding the gas turbine engine to the turbine enclosure, and positioning an engine mount between a base of the turbine enclosure and a component of the gas turbine engine. The engine mount may include an elastomeric material. The method may include transporting the gas turbine engine.

This application and the resultant patent further provide a system for transporting a turbine. The system may include a vehicle, an aeroderivative gas turbine engine, and a turbine enclosure with a base mounted on the vehicle. The system may include a first support positioned between a front leg component of the aeroderivative gas turbine engine and the base, the front support having a first elastomeric material and a second elastomeric material, and a second support positioned between a rear leg component of the aeroderivative gas turbine engine and the base, the second support having the first elastomeric material and the second elastomeric material. The first support and the second support may be configured to dampen vibrations from the base along an X-axis, a Y-axis, and a Z-axis during transportation of the aeroderivative gas turbine engine.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
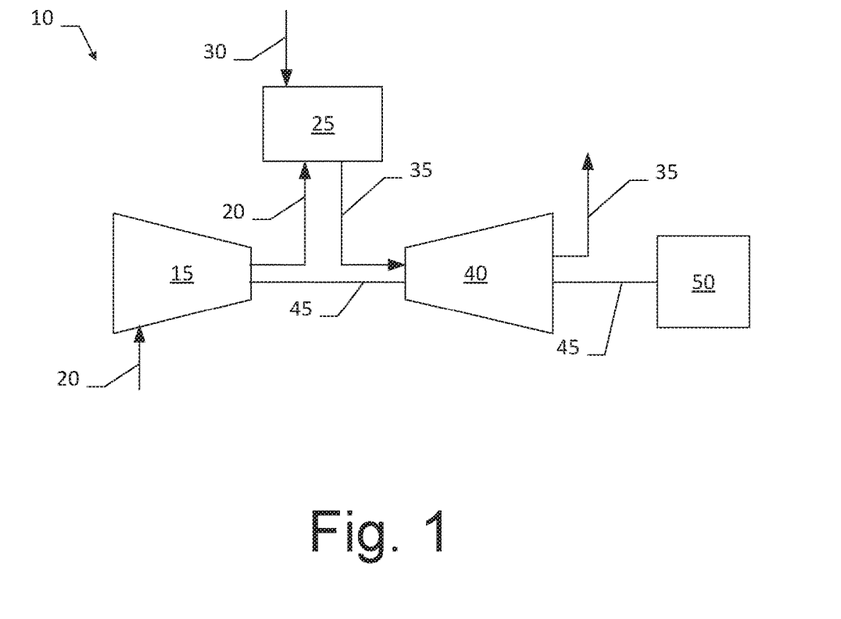
FIG. 1 is a schematic diagram of a gas turbine engine including a compressor, a combustor, and a turbine.

Referring now to the drawings, in which like numerals refer to like elements throughout the several views, FIG. 1 shows a schematic diagram of a gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like. Other configurations and other components may be used herein.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together. Although the gas turbine engine 10 is shown herein, the present application may be applicable to any type of turbo machinery, such as a steam turbine engine.

Figure 2:
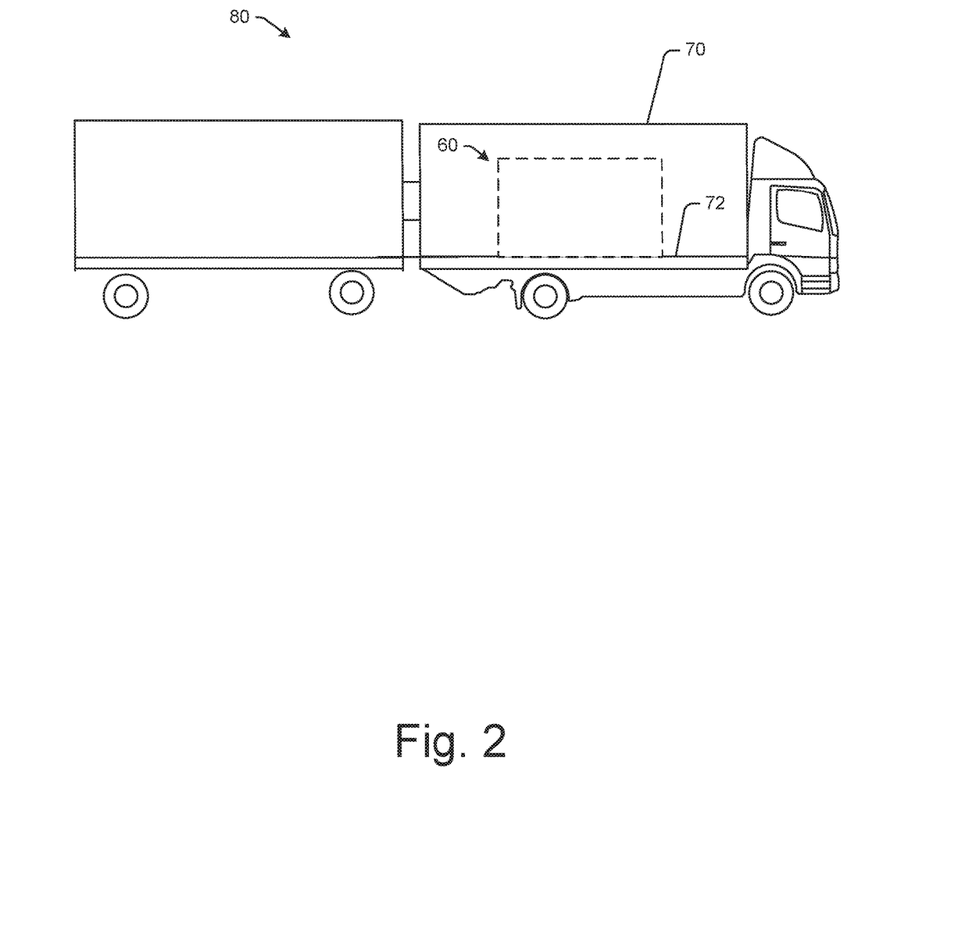
FIG. 2 is a schematic diagram of a portion of a turbine during transportation.

FIG. 2 depicts a portion of a turbine 60 during transportation. The turbine 60 may be an aeroderivative gas turbine engine or another turbine. The turbine 60 may be transported in a turbine enclosure 70 with a base 72 upon which the turbine 60 is positioned. During transportation, an unrestrained amount of impact, shock, vibration, and other occurrences may cause damage to turbine components, such as the bearings, shafts, blades or core of the turbine 60, as well as misalignment of one or more components of the turbine. For example, the turbine 60 may be transported using a truck 80 or other vehicle. The turbine 60 may be subject to shock and other impact due to road conditions, braking, acceleration, and other factors. As the truck 80 moves, an unpredictable amount of impact, shock, or vibration may be imparted on the turbine 60.

Figure 3:
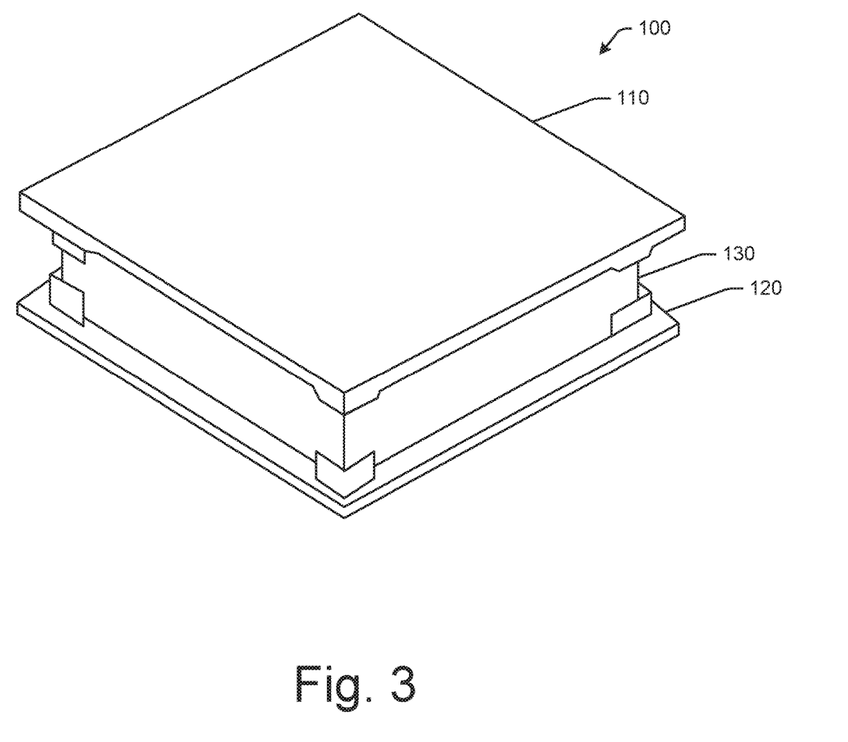
FIG. 3 is a perspective view of an elastomeric shock absorber as described herein.
Figure 4:
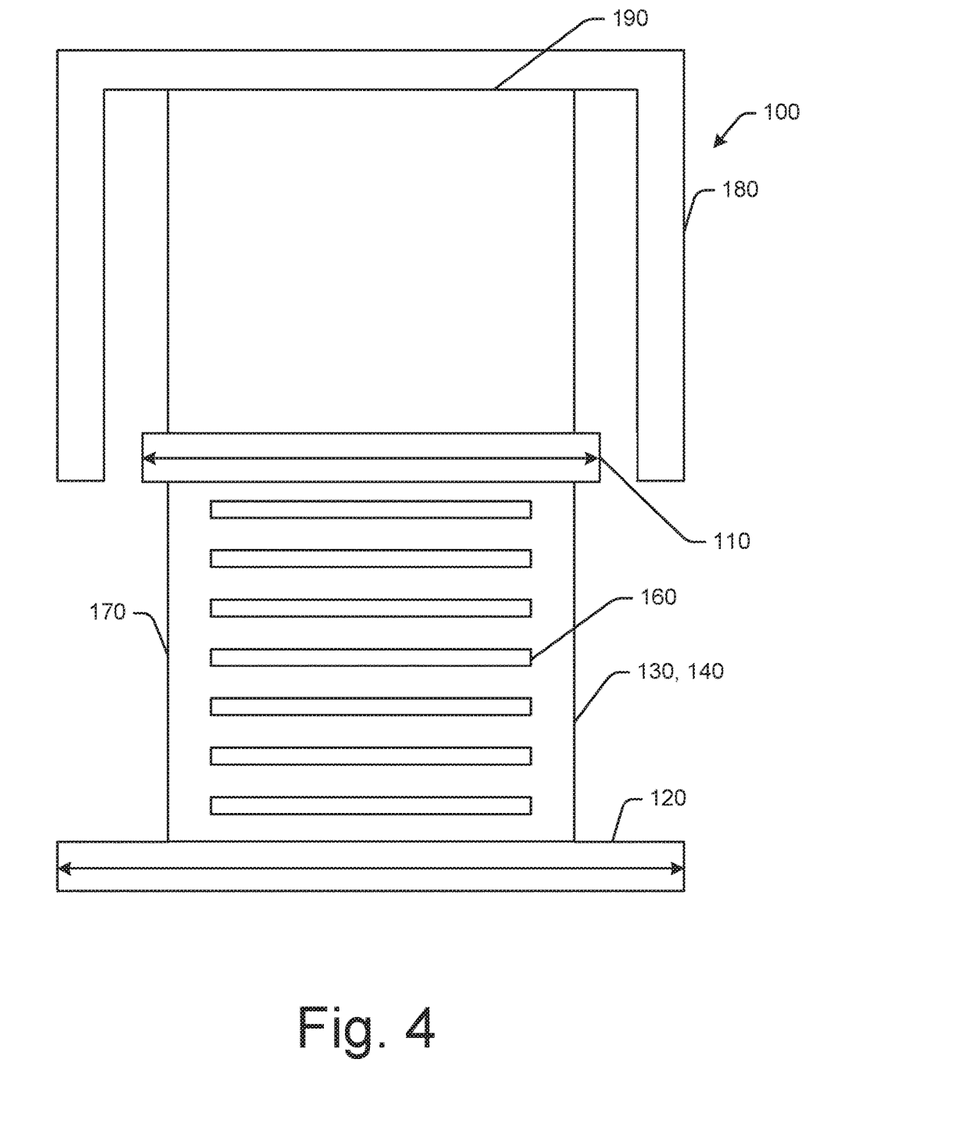
FIG. 4 is a schematic diagram of an elastomeric shock absorber as described herein.

Referring to FIGS. 3 and 4, an example elastomeric shock absorber 100 for turbine transportation as may be described herein is depicted. The elastomeric shock absorber 100 may be an engine mount or isolator and may be configured to absorb or dampen shock, vibration, and other impact that may otherwise be imparted on a turbine. One or more elastomeric shock absorbers 100 may be used to prevent or reduce a likelihood of damage to a turbine during transportation. The elastomeric shock absorber 100 may be an engine mount that is part of a system for transporting a turbine. The elastomeric shock absorber 100 may be positioned in a turbine enclosure and/or between a component of a turbine engine and a base of the enclosure. In some embodiments, multiple engine mounts or elastomeric shock absorbers may be used during transport, such as a first engine mount positioned in a lateral direction and a second engine mount positioned in a vertical direction.

The elastomeric shock absorber 100 may include a first plate 110 and a second plate 120. The first plate 110 may be a load plate and the second plate 120 may be a masonry plate. The first plate 110 may be in contact with one or more components of a turbine that is being transported, and the second plate 120 may be in contact with a portion of a turbine enclosure or other transportation component. The first plate 110 and the second plate 120 may have equal or different thicknesses. The first plate 110 and the second plate 120 may have rectangular geometries, as shown in FIG. 3, or different geometries. As shown in FIG. 4, the second plate 120 may have different dimensions than the first plate 110. For example, the second plate 120 may have a greater width than the first plate 110. Other embodiments may have different configurations.

The elastomeric shock absorber 100 may include an elastomeric bearing 130. The elastomeric bearing 130 may be positioned between the first plate 110 and the second plate 120. The elastomeric bearing 130 with the reinforced material 160 may be configured to absorb or dampen vibration along an X-axis, a Y-axis, and has the high stiffness along the Z-axis of a turbine during transportation.

The elastomeric bearing 130 may be at least partially formed of an elastomeric material 140. For example, the elastomeric bearing 130 may be formed of a material having a shear modulus of equal to or greater than about 0.09 kips per square inch and less than or equal to about 1.5 kips per square inch. The elastomeric material 140 may have a stiffness of equal to or greater than about 200 newton-meters and less than or equal to about 225 newton-meters.

The elastomeric bearing 130 may have one or more elastomeric material layers. In some embodiments, the elastomeric bearing 130 may be formed only of an elastomeric material, while in other embodiments the elastomeric bearing 130 may be formed of more than one material. For example, as shown in FIG. 4, the elastomeric bearing 130 may include one or more steel laminate layers 160 disposed between a number of elastomeric material layers 150. The steel laminate layers 160 may reinforce and/or increase a shear strength or resilience of the elastomeric bearing 130 while maintain the vibration damping along the X and Y axis. Any suitable metal or other reinforcing material may be used. The steel laminate layers 160 may be internal layers. For example, the elastomeric bearing 130 may have an outer coating 170 of elastomeric material, such that the steel laminate layers 160 are position within the elastomeric bearing 130.

The elastomeric bearing 130 may be positioned between the first plate 110 and the second plate 120. In some embodiments, the first plate 110 may be vulcanized or otherwise adhered to a first surface of the elastomeric bearing 130 (e.g., a top surface), and the second plate 120 may be vulcanized or otherwise adhered to a second surface of the elastomeric bearing 130 that is opposite the first surface (e.g., a bottom surface).

As illustrated in FIG. 4, a steel box 180 may be positioned adjacent to the first plate 110. The steel box 180 may be machined and/or welded and may be configured to support one or more components of a turbine. An elastomeric pad 190 may be positioned at least partially within the steel box 180. The elastomeric pad 190 may be in contact with the first plate 110. The pad 190 may be formed of an elastomeric material that may be the same or different than the elastomeric material 140. The pad 190 may have the same or different dimensions than the elastomeric bearing 130. The pad 190 may be coupled to the steel box 180 and/or the first plate 110 by an epoxy bond or another material. The box 180 and the pad 110, under vibration or force along the X and y axis, coupled together as a solid mass, thus the vibration and force along the X and Y axis are transfer to the reinforced elastomeric pad (130,140). Therefore, the vibration along the X and Y axis is damping by the pad 130 while the vibration along the Z axis is mostly absorbed by the pad 190. The design of isolator including the box 180, the plate 110, the elastomeric pad 190, and the reinforced elastomeric pad 130 allows the damping of the vibration along the X, Y, X axis while protecting the elastomeric pad from shear force.

In use, one or more engine mounts/elastomeric shock absorbers as described herein may be positioned about a turbine enclosure to protect the turbine during transportation. A turbine may be mounted and aligned in a turbine enclosure. For example, the turbine may be grounded to the turbine enclosure base, such that there is fully solid contact between the turbine and the base. The engine mounts/elastomeric shock absorbers or design may provide a quick and easy converting to solid mount support for the turbine to the base prior to operation of the turbine. Startup and/or installing time may therefore be reduced.

Figure 5:
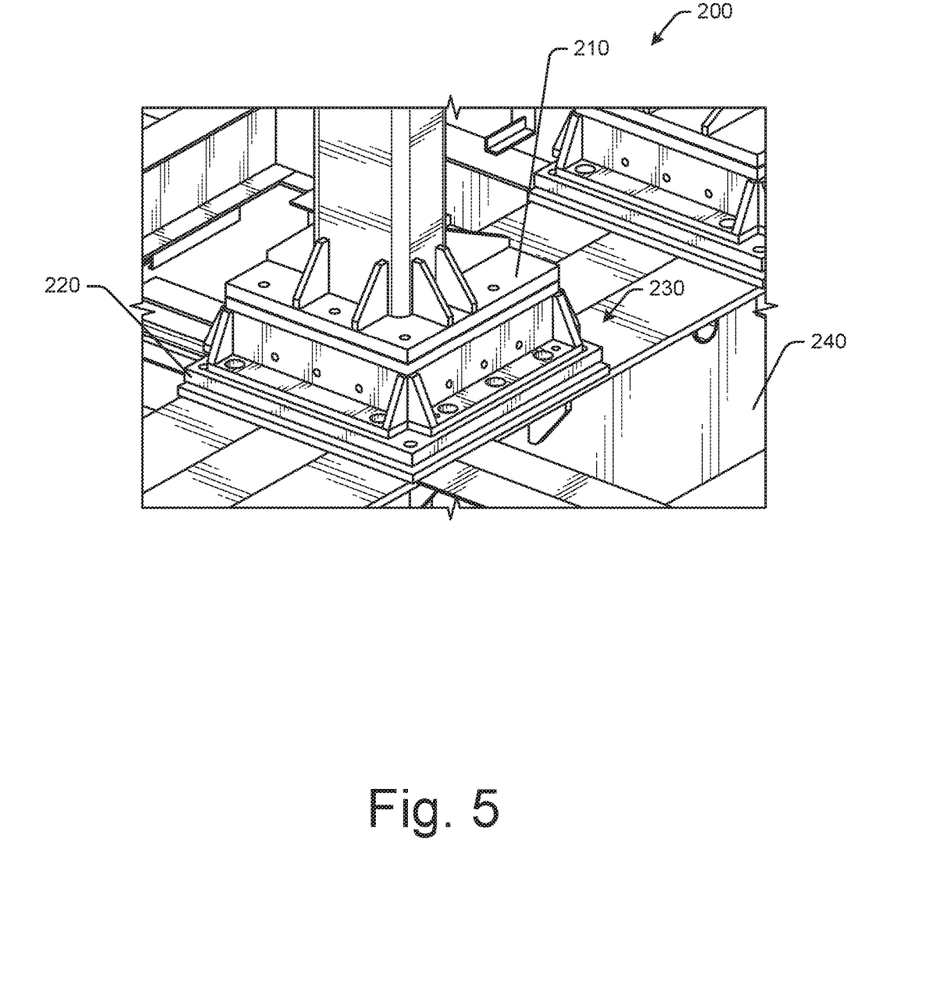
FIG. 5 depicts a front isolator mount that may be used for turbine transportation.

FIG. 5 illustrates an isolator front mount 200. The isolator front mount 200 may be coupled to one or more front legs 210 of a turbine or turbine support component during transportation. The isolator front mount 200 may be configured to absorb shock and/or vibration during transportation of the turbine. The isolator front mount 200 may include a mounting surface 220 that is coupled to the front leg 210 and a base 240 of a turbine enclosure. The isolator front mount 200 may be coupled to the base 240 with a number of bolts 230. Other configurations may be used.

Figure 6:
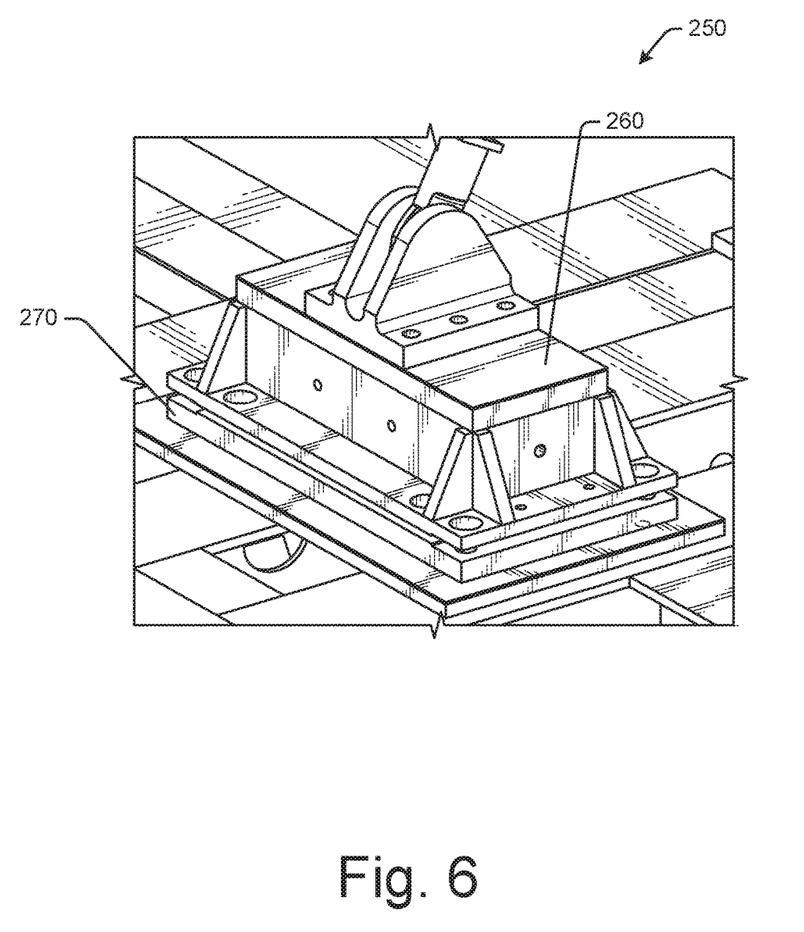
FIG. 6 depicts a rear isolator mount that may be used for turbine transportation.

FIG. 6 illustrates an isolator rear mount 250. The isolator rear mount 250 may be coupled to one or more rear legs 260 of a turbine or turbine support component during transportation. The isolator rear mount 250 may be configured to absorb shock and/or vibration during transportation of the turbine. The isolator rear mount 250 may include a mounting surface 270 that is coupled to the rear leg 260 and the base 240 of the turbine enclosure. The isolator rear mount 250 may be coupled to the base 240 with a number of bolts. Other configurations may be used.

Figure 7A:
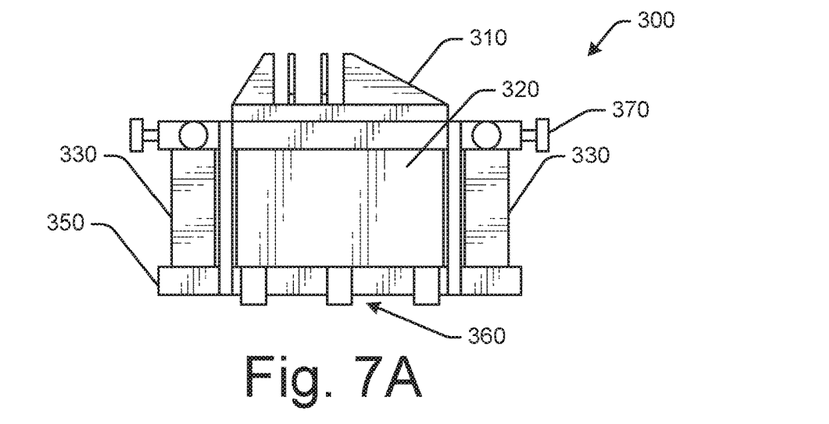
FIGS. 7A-7C depict a front isolator mount with an elastomeric shock absorber as described herein.
Figure 7B:
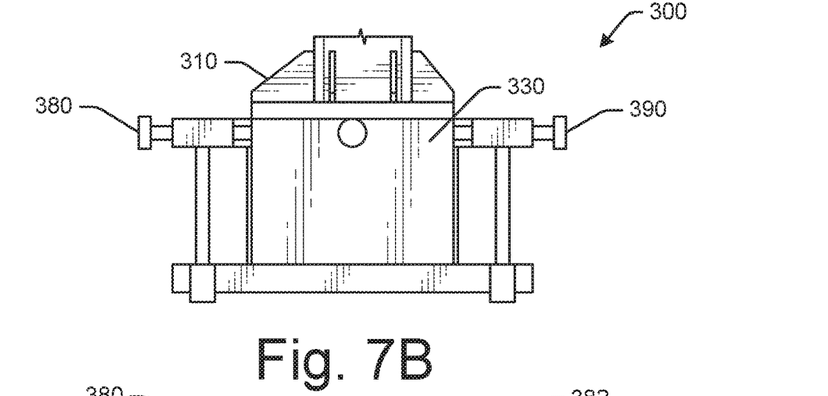
Figure 7C:
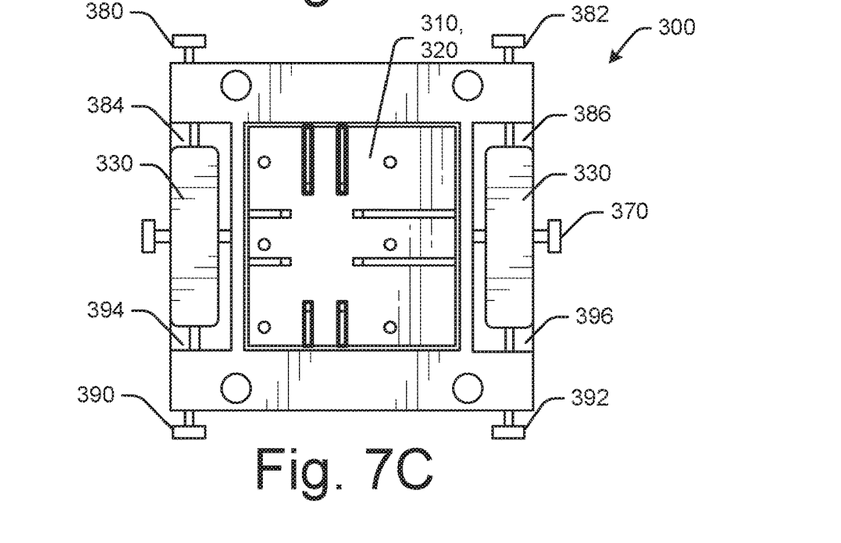

FIGS. 7A-7C depict a front isolator mount 300 with an elastomeric shock absorber as described herein. In an elevation view illustrated in FIG. 7A, the front isolator mount 300 may be coupled to a front leg 310 of a turbine or turbine support component during transportation. The front isolator mount 300 may include a first elastomeric material 320 positioned in a middle portion of the front isolator mount 300, and a second elastomeric material 330 positioned on one or more sides of the first elastomeric material 320. For example, in FIGS. 7A-7C, the second elastomeric material 330 may be positioned on opposite sides of the first elastomeric material 320. The first elastomeric material 320 may be the same material or a different material than the second elastomeric material 330. For example, the first elastomeric material 320 may be harder or softer than the second elastomeric material 330. The front isolator mount 300 may include a base portion 350 that may support or be in contact with the first elastomeric material 320 and the second elastomeric material 330. A number of bolts 360 or other components may extend through the base portion 350.

The front isolator mount 300 may include a number of jacking bolts that may be used to control various positioning aspects of the front isolator mount 300. For example, adjustment of the jacking bolts may result in changes in lateral or vertical position of the turbine leg 310. The front isolator mount 300 may include a first jacking bolt 340 and a second jacking bolt 370 that is opposite the first jacking bolt 340. In some instances, there may be more than one jacking bolt on a side of the front isolator mount 300. For example, on a first side of the front isolator mount 300 perpendicular to the sides of the front isolator mount 300 with the second elastomeric material 330, a third jacking bolt 380 and a fourth jacking bolt 382 may be used to modify positioning of the second elastomeric material 330, which may affect impact of lateral shock or vibration. On an opposite side, a fifth jacking bolt 390 and a sixth jacking bolt 392 may be used for moving the second elastomeric material 330 in an opposite direction.

In particular, adjusting the third jacking bolt 380 may adjust a gap 384 between a frame portion of the front isolator mount 300 and the second elastomeric material 330. Adjusting the fourth jacking bolt 382 may adjust a gap 386 between a frame portion of the front isolator mount 300 and the other second elastomeric material 330. Adjusting the fifth jacking bolt 390 may adjust a gap 394 between a frame portion of the front isolator mount 300 and the second elastomeric material 330. Adjusting the sixth jacking bolt 392 may adjust a gap 396 between a frame portion of the front isolator mount 300 and the other second elastomeric material 330. Accordingly, the jacking bolts may be used to modify positioning of a turbine leg, and may improve shock absorption. Some embodiments may include a single second elastomeric material on one side of the front isolator mount 300, while other embodiments may include the second elastomeric material on two different sides or more than two sides of the front isolator mount 300.

Figure 8A:
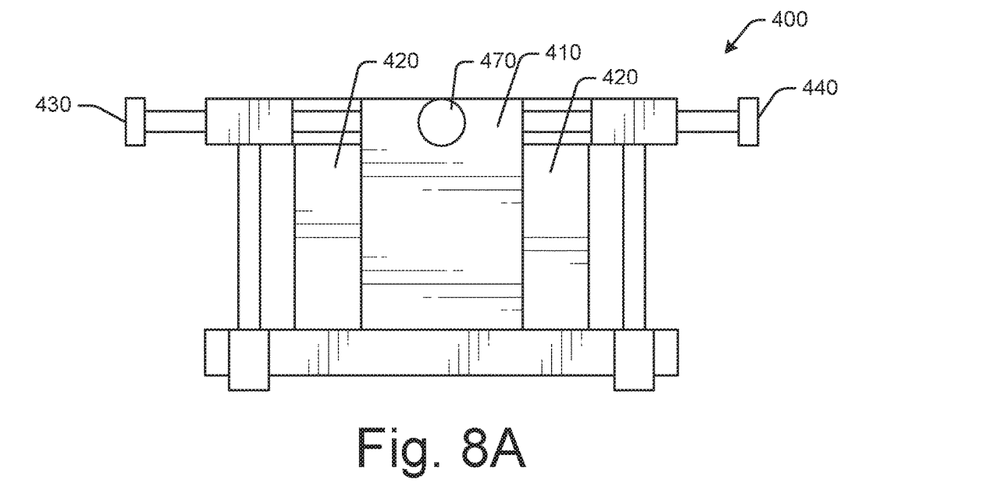
FIGS. 8A-8B depict a rear isolator mount with an elastomeric shock absorber as described herein.
Figure 8B:
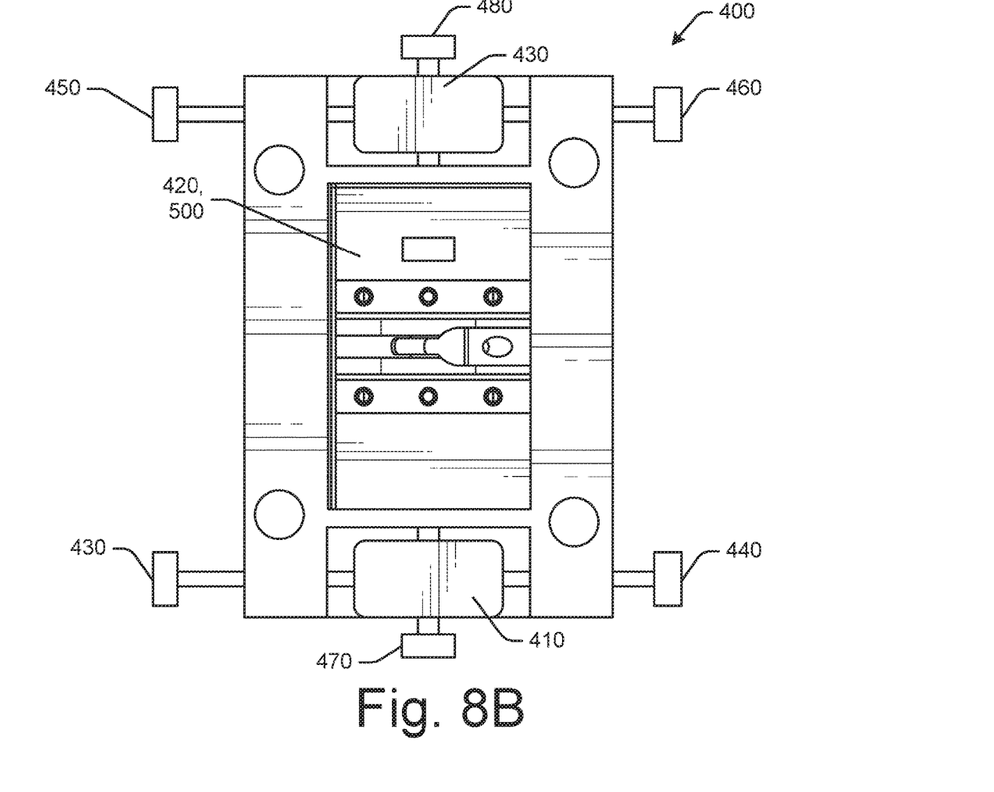

FIGS. 8A-8B depict a rear isolator mount 400 with an elastomeric shock absorber as described herein. The rear isolator mount 400 may include a first elastomeric material 420 positioned in a middle portion of the rear isolator mount 400. A second elastomeric material 410 may be positioned on a first side of the first elastomeric material 420, and a third elastomeric material 430 may be positioned on a second side of the first elastomeric material 420. The second side may be opposite the first side. The first elastomeric material 420 may be the same or different than the second elastomeric material 410 and/or the third elastomeric material 430. In some embodiments, the second elastomeric material 410 and the third elastomeric material 430 may be the same material, while in other embodiments, the second elastomeric material 410 and the third elastomeric material 430 may be different materials. The second elastomeric material 410 and the third elastomeric material 430 may have greater respective heights than the first elastomeric material 420. The rear isolator mount 400 may support a rear leg 500 of a turbine or turbine support component.

The rear isolator mount 400 may include one or more jacking bolts for positional adjustments of the rear leg 500. For example, adjustment of the jacking bolts may result in changes in lateral or vertical position of the rear leg 500. The rear isolator mount 400 may include a first jacking bolt 430 and a second jacking bolt 440 that is opposite the first jacking bolt 430. In some instances, there may be more than one jacking bolt on a side of the rear isolator mount 400. For example, a third jacking bolt 450 may be on the same side of the rear isolator mount 400 as the first jacking bolt 430, and a fourth jacking bolt 460 may be on the same side of the rear isolator mount 400 as the second jacking bolt 440. The first jacking bolt 430 and the second jacking bolt 440 may be used to modify positioning of the second elastomeric material 410, which may affect impact of lateral shock or vibration. On an opposite side, the third jacking bolt 450 and the fourth jacking bolt 460 may be used to modify positioning of the third elastomeric material 430. Additional jacking bolts may be positioned transverse to the other jacking bolts for added range of movement. For example, a fifth jacking bolt 470 may be configured to move the second elastomeric material 410 closer or farther to the first elastomeric material 420. A sixth jacking bolt 480 may be configured to move the third elastomeric material 430 closer or farther to the first elastomeric material 420.

One or more engine mounts as described herein may therefore prevent damage to turbines during transportation. The engine mounts or isolators described herein may be relatively low cost with optimized performance. Transportation shock load onto a turbine may be isolated. The engine mounts may produce a damping effect and prevent damage. Vibrations in the X-, Y-, and/or Z-axis may be dampened or absorbed, reducing a risk of damage.

A method of using an elastomeric shock absorber for transporting a turbine as described herein may include the steps of providing a gas turbine engine for transportation, providing a turbine enclosure for the gas turbine engine, grounding the gas turbine engine to the turbine enclosure, and positioning an engine mount between a base of the turbine enclosure and a component of the gas turbine engine. The engine mount may include an elastomeric material. The method may include transporting the gas turbine engine.

As a result of the elastomeric shock absorbers described herein, damage to turbines or turbine components, such as misalignment and other damage, may be reduced. The elastomeric shock absorbers described herein may provide a simple and cost-effective solution to prevent damage to turbines during transportation or other movement, and may effectively prevent damage due to shock, vibration, and other occurrences and external forces. Certain embodiments may be reusable and may provide improved protection.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. An engine mount for use with a vehicle or trailer during transportation of a gas turbine engine comprising:
   a first plate;
   a second plate, wherein the second plate has a greater width than the first plate, and wherein a component of the gas turbine engine is in contact with the first plate; and
   an elastomeric bearing positioned between the first plate and the second plate, wherein the engine mount is configured to absorb or dampen vibration along an X-axis, a Y-axis, and a Z-axis of the gas turbine engine during transportation.

2. The engine mount of claim 1, wherein the elastomeric bearing comprises a plurality of elastomeric material layers.

3. The engine mount of claim 2, further comprising a plurality of steel laminate layers disposed between the plurality of elastomeric material layers.

4. The engine mount of claim 3, wherein the elastomeric bearing comprises an outer coating of elastomeric material.

5. The engine mount of claim 1, wherein the first plate is vulcanized to a first surface of the elastomeric bearing, and the second plate is vulcanized to a second surface of the elastomeric bearing that is opposite the first surface.

6. The engine mount of claim 1, further comprising a steel box adjacent to the first plate.

7. The engine mount of claim 6, further comprising a plain pad positioned within the steel box and in contact with the first plate.

8. The engine mount of claim 1, wherein the first plate and the second plate comprise equal thicknesses.

9. The engine mount of claim 1, wherein the first plate and the second plate comprise rectangular geometries.

10. The engine mount of claim 1, wherein the gas turbine engine is an aeroderivative gas turbine engine.

11. The engine mount of claim 1, wherein the elastomeric bearing comprises an elastomeric material that has at least two different shear modulus values.

12. The engine mount of claim 1, wherein the elastomeric bearing comprises an elastomeric material that has a stiffness of equal to or greater than about 200 newton-meters and less than or equal to about 225 newton-meters.

13. The engine mount of claim 1, wherein the engine mount is positioned inside a turbine enclosure for the gas turbine engine.

14. An engine mount for use with a vehicle or trailer during transportation of a gas turbine engine comprising:
   a first plate;
   a second plate, wherein the second plate has a greater width than the first plate, and wherein a component of the gas turbine engine is in contact with the first plate; and
   a plurality of alternating elastomeric material and steel laminate layers disposed between the first plate and the second plate.

15. The engine mount of claim 14, wherein the elastomeric material layers are configured to absorb or dampen vibration along an X-axis, a Y-axis, and a Z-axis of the gas turbine engine during transportation.

16. The engine mount of claim 14, wherein the plurality of alternating elastomeric material and steel laminate layers are enclosed in an elastomeric outer layer.

17. The engine mount of claim 14, wherein elastomeric material of the plurality of alternating elastomeric material and steel laminate layers has more than one shear modulus value.

* * * * *